April 27, 1926.

H. W. SANFORD

MINE CAR

Filed Sept. 11, 1924    6 Sheets-Sheet 3

Inventor
Hugh W. Sanford
By Cyrus Kehr
Attorney

H. W. SANFORD

MINE CAR

Filed Sept. 11, 1924  6 Sheets-Sheet 5

Inventor
Hugh W. Sanford
By Cyrus Kehr
Attorney

Patented Apr. 27, 1926.

1,582,350

UNITED STATES PATENT OFFICE.

HUGH W. SANFORD, OF KNOXVILLE, TENNESSEE.

MINE CAR.

Application filed September 11, 1924. Serial No. 737,155.

*To all whom it may concern:*

Be it known that I, HUGH W. SANFORD, a citizen of the United States, residing at Knoxville, in the county of Knox and State of Tennessee, have invented a new and useful Improvement in Mine Cars, of which the following is a specification, reference being had to the accompanying drawing.

My improvement relates particularly to the wheel and axle and axle bearing construction of mine cars.

The object of the invention is to provide a convenient and effective construction comprising axles and wheels and axle bearings and means for engaging the axle bearings.

In the accompanying drawings.

Referring to said drawings, A, A are axles, B, B are wheels having hubs, $B^1$, surrounding the axles, C, C are angle plates extending along the side of the car frame and across the axles. Each such plate has a horizontal flange, $C^1$, bearing against the lower face of the wooden bottom, D; and each such plate has a downward directed flange, $C^2$, which is notched from below to receive the axles. In the form shown in the drawings, the horizontal flange, $C^1$, is curved upward at $C^3$ above each axle. The lower face of the wood bottom, D, is cut away to make room for this upward extension of the angle plate. The purpose of this arrangement is to bring the car bottom lower than would otherwise be the case. $D^1$ is the upright side wall of the car body. The body of the car may be of any desired construction, the wood bottom being secured in any desired manner, as by means of bolts, $D^2$, extending through said bottom and the horizontal flange, $C^1$, of the angle plate. (Figs. 1, 2, 3 and 4.)

The axle box body, E, surounds the axle and has at each end an axle box, $E^1$, integral with said body and reaching under the adjacent angle plate, C. Thus a single axle box body is used for the two bearings of the same axle. Between its ends, the upper face of each axle box $E^1$, has a transverse horizontal nearly straight ridge or summit, $E^2$, resting against the lower face of the flange, $C^1$, of the angle plate. Said lower face is provided with a recess or groove, $C^4$, in which the ridge, $E^2$, rests. Said ridge or summit is transverse to the axle and forms a line on which the axle box may relatively rock on said flange of the angle plate, this feature contributing to making this a self-aligning axle box of a general type already known in this art. Let it be noted that the box is to maintain its alignment with the axle, and that the car body is to make adjustment relative to the axle box. A strap or stirrup, $E^3$, extends around the axle box and has its ends, $E^4$, secured to the lower face of the angle plate flange, $C^1$, by means of bolts, $E^5$. At each side of the upright part of the strap, the axle box has a lug, $E^6$, which, by engagement with the strap, limits endwise movement of the axle box. The upright parts of the strap come close to the sides of the axle box; but the lower part of the strap is curved downward away from the lower face of the axle box, as shown in Figs. 2, 6, 7, 10 and 11. Thus the strap allows some downward movement of the axle box relative to the car body. This is for the purpose of permitting the wheel to move downward when the car is passing over a depression in the track at that side of the car. But such downward movement is at all times limited by the strap.

The rocking above mentioned is on a horizontal face and parallel to a plane which is upright and parallel to the car axle. The strap, $E^3$, also permits rocking of the axle box parallel to a horizontal plane. The rocking above described involves the flexing or springing of the body of the car.

Figure 1:
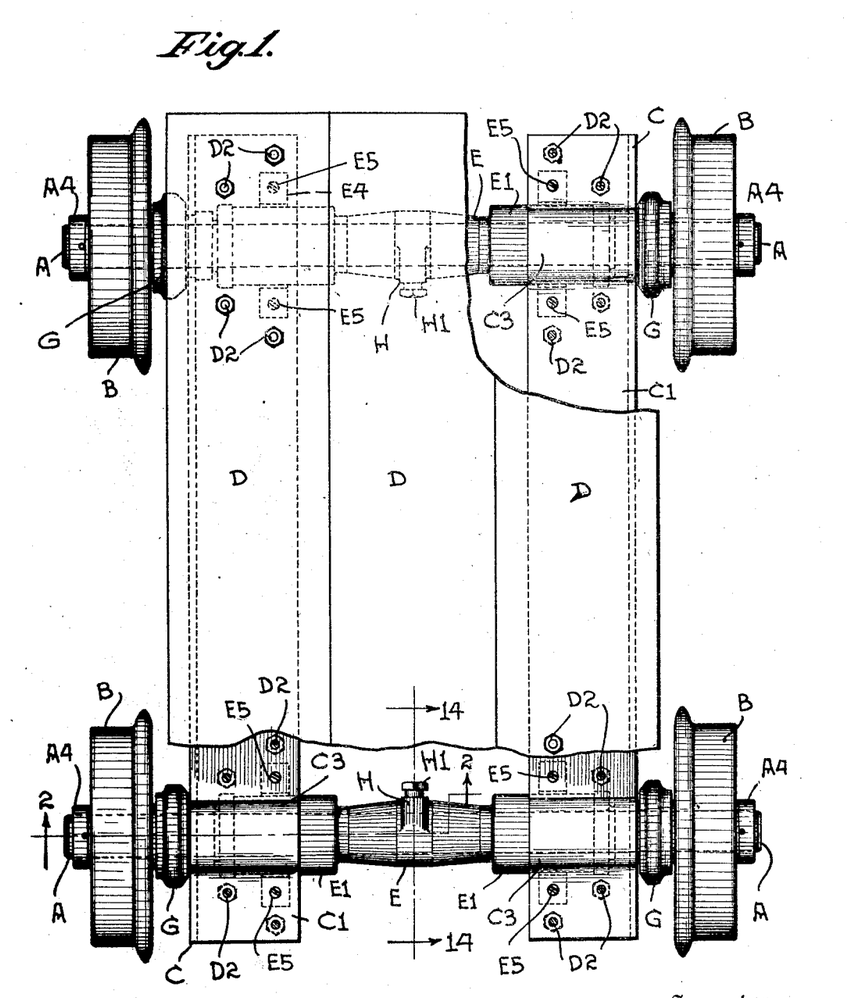
Fig. 1 is a plan showing the under structure of a mine car embodying my improvement.
Figure 2:
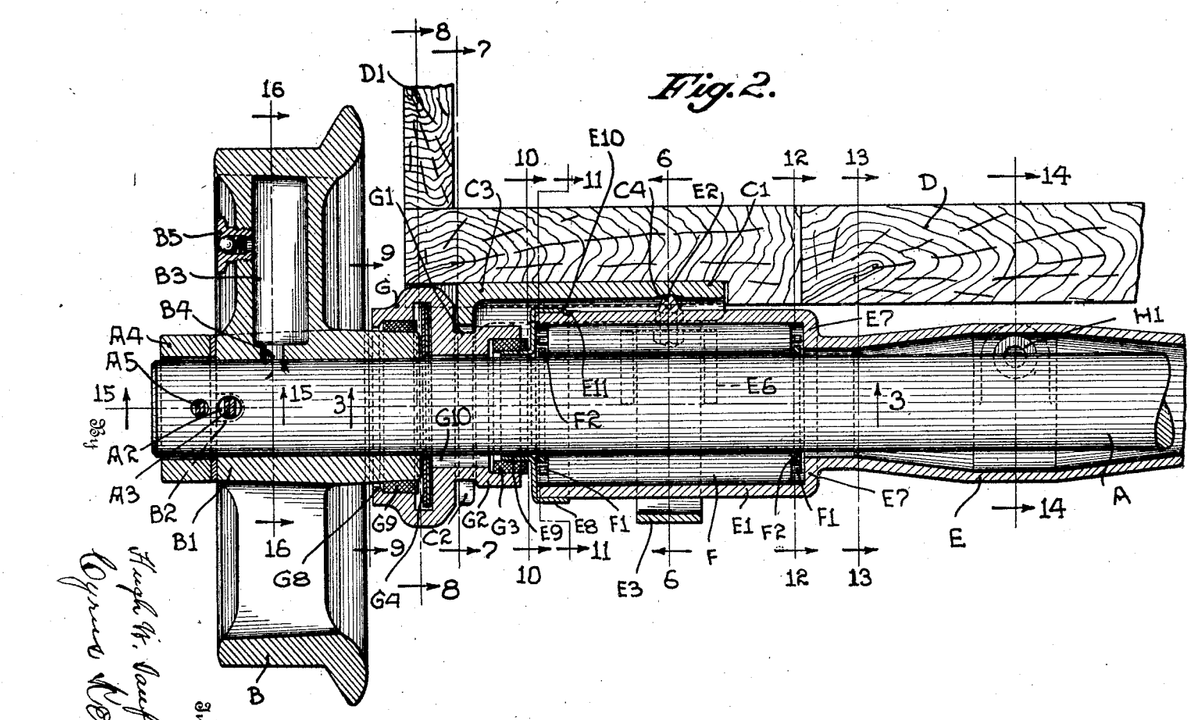
Fig. 2 is an upright section on the line, 2—2 of Fig. 1, looking in the direction of the arrow.
Figure 3:
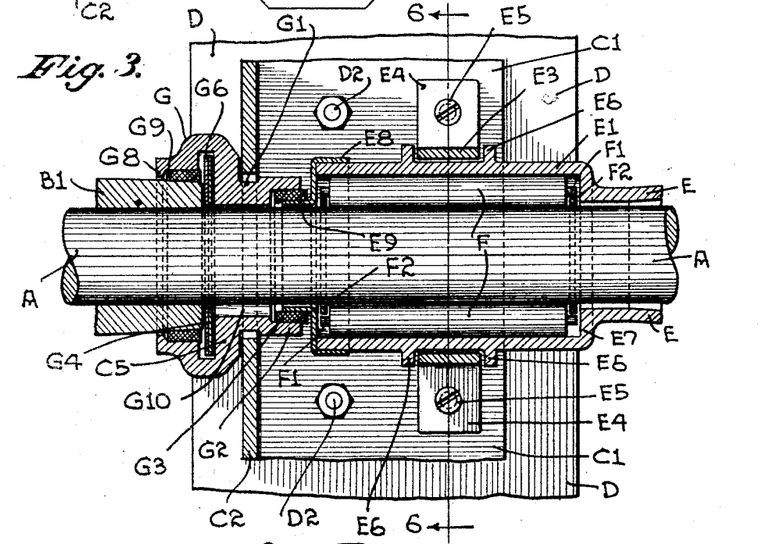
Fig. 3 is a horizontal section on the line, 3—3, of Fig. 2, looking upward.
Figure 4:
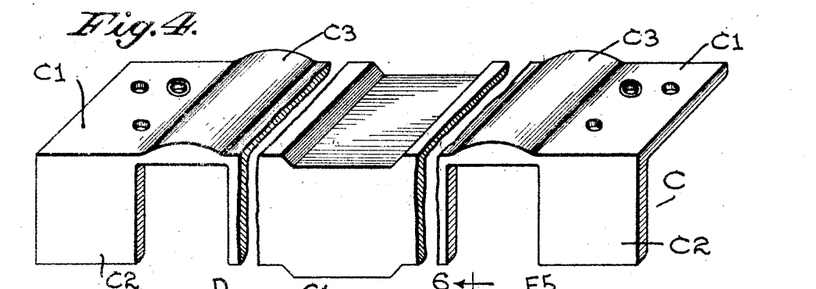
Fig. 4 is a perspective of one of the angle plates which extend from axle to axle and form pedestals for the bearing boxes, parts being broken away.

The inner or right hand end of the axle box, as shown in Fig. 2, has an upright wall, $E^7$, which extends nearly to the axle, A, sufficient space being left around the axle for the passing of lubricant, as will appear further on.

The opposite or outer end of the axle box has no end wall formed integral with said box. A ring, $E^8$, loosely surrounds the axle and bears against the end of the box. The main part of said ring is in a plane transverse to the axle. Next to said axle, the ring has a flange, $E^9$, directed toward the wheel, there being a space between said flange and the axle for the passing of lubricant. Any number of parts, $E^{10}$, are bent into a recess or recesses, $E^{11}$, formed on the outer face of the axle box. By this means said ring is removably secured to the axle box.

The axle box body and the axle boxes together constitute an axle box structure.

In the space around the axle and within the axle box are anti-friction rollers, F, placed parallel to the axle and having at each end a small journal, $F^1$. Within each end of the axle box a retaining ring, $F^2$, surrounds the axle and extends between the axle and the adjacent journals, $F^1$, each such ring being so proportioned as to preclude movement of the journals, $F^1$, toward the bearing axis for the dislodging of the rollers when the axle has been removed from the bearing.

Figure 5:
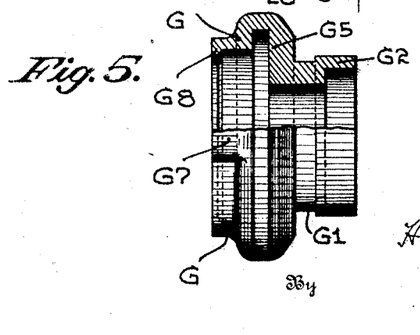
Fig. 5 is a detached side elevation of the collar which intervenes the axle box and wheel hub, parts being broken away.
Figure 6:
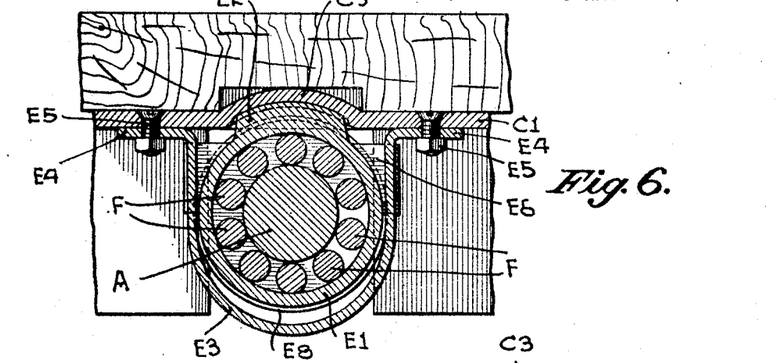
Fig. 6 is an upright section on the line, 6—6, of Figs. 2 and 3, looking toward the left.
Figure 7:
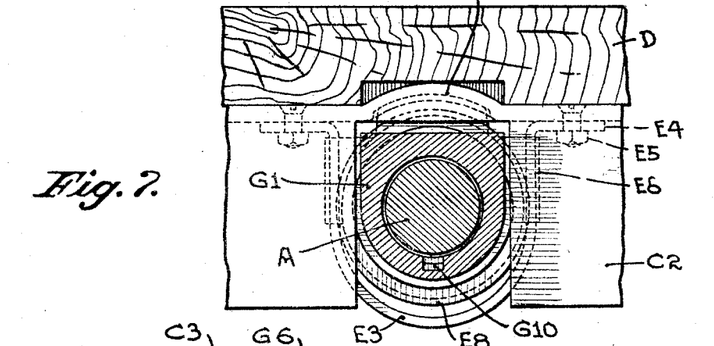
Fig. 7 is an upward section on the line, 7—7, of Fig. 2, looking toward the right.
Figure 8:
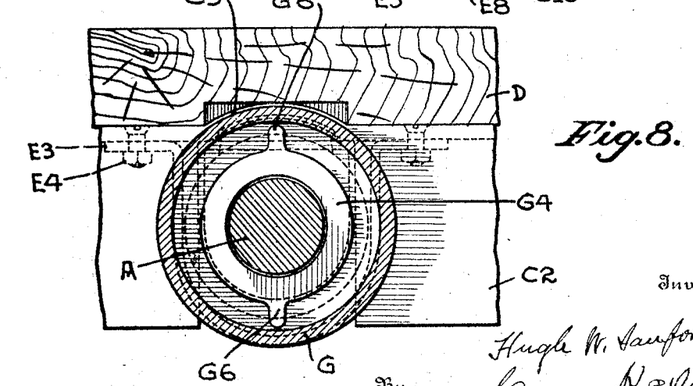
Fig. 8 is an upright section on the line, 8—8, of Fig. 2, looking toward the right.
Figure 9:
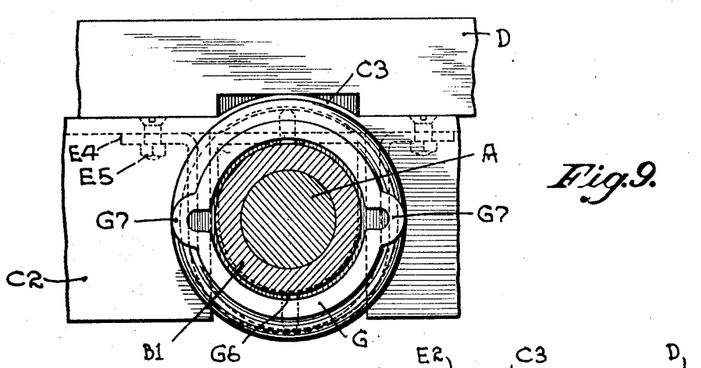
Fig. 9 is an upright section on the line, 9—9, of Fig. 2, looking toward the right.
Figure 10:
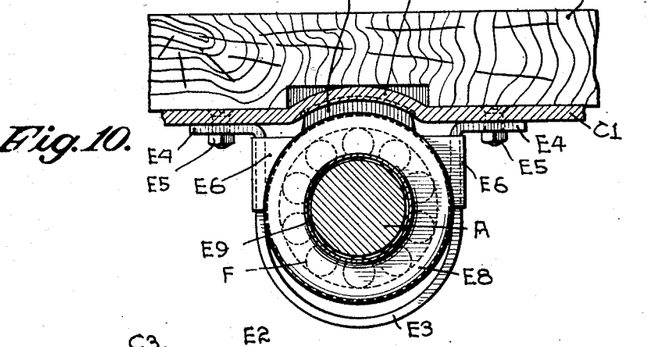
Fig. 10 is an upright section on the line, 10—10, of Fig. 2, looking toward the right.
Figure 11:
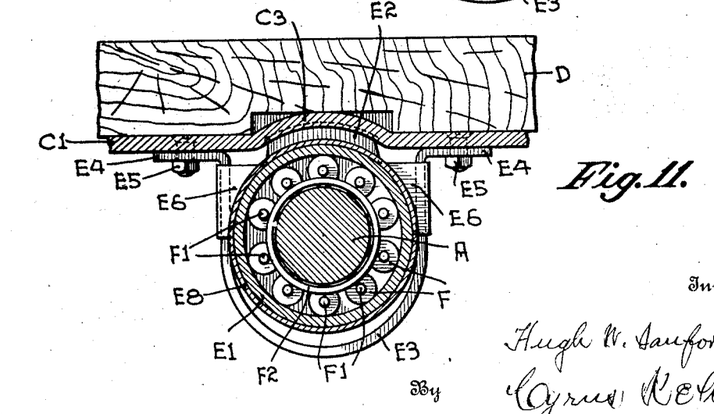
Fig. 11 is an upright section on the line, 11—11, of Fig. 2, looking toward the right.
Figure 12:
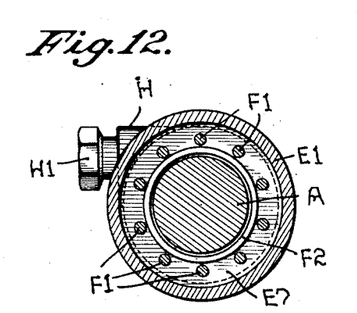
Fig. 12 is an upright section on the line, 12—12, of Fig. 2, looking toward the right.
Figure 13:
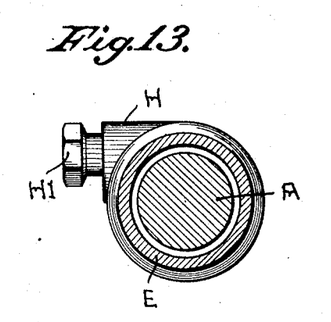
Fig. 13 is an upright section on the line, 13—13, of Fig. 2, looking toward the right.
Figure 14:
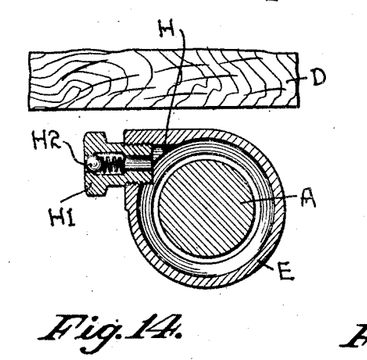
Fig. 14 is an upright transverse section on the line, 14—14, of Figs. 1 and 2, looking toward the right.
Figure 15:
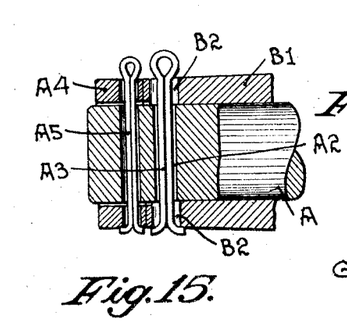
Fig. 15 is a horizontal section on the line, 15—15, of Fig. 2.
Figure 16:
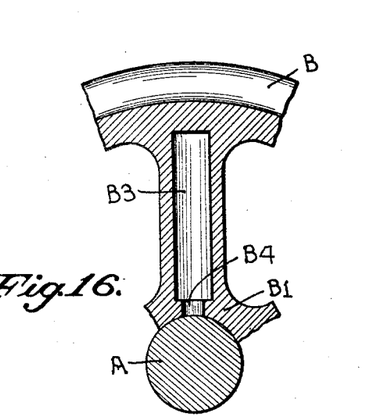
Fig. 16 is an upright section on the line, 16—16, of Fig. 2, looking toward the right.
Figure 17:
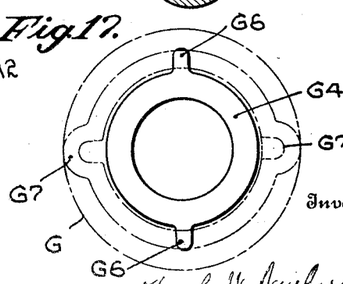
Fig. 17 is a detached view of a washer, the surrounding part of the collar, G, being shown by dotted lines.

A sealing collar, G, (Figs. 5, 2 and 3) surrounds the axle between the inner end of the wheel hub and the adjacent end of the axle box. This collar has a neck, $G^1$, extending through the notched part of the flange, $C^2$, of the angle plate. The upper part of the neck $G^1$, is angular in cross section as shown in Fig. 7. This construction prevents turning of said collar. The part of said collar at the inner side of the flange, $C^2$, is expanded and extended in the form of an annular flange, $G^2$, toward the ring, $E^8$, and around the flange, $E^9$, of the ring, $E^8$, sufficient space being left between the flanges, $G^2$ and $E^9$, to receive felt or similar packing, $G^3$, which is to prevent the passing of lubricant and dust and other foreign matter. The flange, $G^2$, is of larger external diameter than the space in the angle plate flange, $C^2$. Thus said collar is held against endwise movement on the axle in the direction of the wheel. At the outer side of the flange, $C^2$, the collar is also enlarged to extend over a part of the outer face of the flange, $C^2$. Thus the collar is prevented from endwise movement on the axle away from the wheel. As above described, the neck is held against turning with the axle, but it is permitted to move up and down with the axle to the extent allowed by the strap or stirrup, $E^3$. The part of the collar at the outer side of the angle plate flange, $C^2$, is extended around the hub, $B^1$. At the inner end of the hub, the collar is recessed to receive two washers, $G^4$, which bear against each other and one of which bears against the end of the hub and the other of which bears against the adjacent upright face, $G^5$. (See Figs. 2, 5 and 17). Said washers are of smaller diameter than the diameter of the recess or chamber in which they are located, and said washers have marginal lugs or extensions, $G^6$, which serve as wings for driving oil circumferentially during the rotation of said washers by frictional engagement of one of the washers with the hub and the engagement of that washer with the other washer, when the wheel is "loose", as will be described further on. The outer end of the collar has marginal extensions, $G^7$, which permit the passing of the lugs or extensions, $G^6$, when the washers, $G^4$, are being inserted. The recess occupied by the washers is extended toward the right to make the measurement of said recess in that direction more than the combined thickness of the two washers. At the outer end of the collar is a narrow inward-directed flange, $G^8$. Between said flange and the recess for the washers, the space between the hub and the collar is filled with packing, $G^9$, consisting of felt or similar material adapted to preclude the passing of dust and lubricant.

In the lower part of the collar, G, (Figs. 2 and 7) there is a channel, $G^{10}$, extending along the axle and from the washer recess or chamber into the space enclosed by the flange, $G^2$. The purpose of this is to allow passing of lubricant from the interior of the axle box through the space between the axle and the ring flange $E^9$, into said channel and thence to the space occupied by the washers, $G^4$.

The outer end of the hub, $B^1$, has two diametrically opposite notches, $B^2$, which are adapted to be brought into alignment with the transverse aperture, $A^2$, for receiving a cotter pin, $A^3$, which will serve to prevent rotation of the axle, whereby the wheel is made "fast". Next to the outer end of the hub a sleeve, A⁴, surrounds the axle and is secured thereto by a transverse cotter pin, A⁵. This sleeve, A⁴, bears against the adjacent end of the hub. When the wheel is to be "loose", the cotter pin, A⁵, is removed.

It will now be seen that wheel thrust parallel to the axle and toward the car body will be taken by the washers, G⁴, and transmitted by said washers to the collar, G, and transmitted by the latter to the angle plate flange, C². End thrust in the other direction is similarly absorbed by engagement of the hub of the opposite wheel with the washers, G⁴, at the opposite end of the axles. Thus the axle box body, including the two axle boxes, is made free or "floating" on the axle and is free to take the rocking movements above described and to move endwise to the extent permitted by the collars, G, which, as above described, are held against endwise movement by the angle plate, C². Endwise movement of the axle box body is ordinarily prevented by engagement of the ridge, E², in the recess, C⁴, formed in the lower face of the horizontal flange, C¹, of the angle plate. When the wheels and axles drop or the end of the car body rises while traversing track irregularity, the ridges, E², may become disengaged sufficiently to allow endwise movement. As already described, a part of the function of the strap or stirrup, E³, is to engage the lugs, E⁶, on the axle box for limiting endwise movement of the axle box. But the strap is adapted to resist only moderate end thrust of the axle box. The collar, G, having the strong seating in the flange, C², which serves as a pedestal, is adapted to offer larger resistance to end thrust of the axle box.

The wheel, B, has an oil reservoir, B³, which communicates with the interior of the hub through the outlet port, B⁴, and which is to receive lubricant through the inlet port, B⁵, said port being ordinarily plugged in any suitable manner, preferably such a tubular spring valved plug as has heretofore been used for the purpose of delivering lubricant into wheels or bearings. This lubricant is needed only when the wheel is "loose."

Midway between the ends of the axle box body there is a lateral lubricant port, H, which communicates with the interior of the axle box body. To said port is applied a plug, H¹, having a ball valve, H², which yields inwardly to grease pressure from the outside. While the car is standing over a pit under the track, a man in the pit applies any suitable lubricant driving device to the plug, H¹, and causes the driving of lubricant through said port into and through the space between the axle and the adjacent wall of the axle box body and thence into the axle boxes, and into the spaces between the rollers, F. Subsequently some of the lubricant will pass outward between the flange, E⁹, and the axle and onward through the channel, G¹⁰, in the collar, G, and thence to the washers, G⁴.

Between the axle boxes the axle box body is of larger interior diameter than the diameter of the axles, whereby an oil reservoir is formed.

It is to be noted that the axle box structure is supported on the axle by the rollers, F, and that the collars, G, are supported by the axle.

I claim as my invention:—

1. In a railway car, the combination with an axle and a wheel and an axle box surrounding the axle, of a pedestal flange having a notch through which the axle extends, a collar surrounding the axle and having a neck in said notch and said collar being enlarged at each side of said flange whereby said collar is held against endwise movement on the axle, substantially as described.

2. In a railway car, the combination with an axle and a wheel and an axle box surrounding the axle, of a pedestal flange having a notch through which the axle extends, a collar surrounding the axle and having a neck in said notch and said collar being enlarged at each side of said flange whereby said collar is held against endwise movement on the axle, and said neck being shaped to engage the pedestal flange to prevent turning of the collar on the axle, substantially as described.

3. In a railway car, the combination with an axle and a wheel and an axle box surrounding the axle, of a pedestal flange having a notch through which the axle extends, a collar surrounding the axle and channeled for the passing of lubricant and having a neck in said notch and said collar being enlarged at each side of said collar, whereby said collar is held against endwise movement on the axle, substantially as described.

4. In a railway car, the combination with an axle and a wheel and an axle box surrounding the axle, of a pedestal flange having a notch through which the axle extends, a collar surrounding the axle and channeled for the passing of lubricant and having a neck in said notch and said collar being enlarged at each side of said collar, whereby said collar is held against endwise movement on the axle, and said neck being shaped to engage the pedestal flange to prevent turning of the collar on the axle, substantially as described.

5. In a railway car, the combination with an axle and a wheel and an axle box surrounding the axle, a pedestal flange having a notch through which the axle extends, a collar surrounding the axle and having in its lower part a channel for the passing of lubricant and being engaged in said notch to be held against endwise movement on the axle, substantially as described.

6. In a railway car, the combination with an axle and a wheel and an axle box surrounding the axle, a pedestal flange having a notch through which the axle extends, a collar surrounding the axle and having in its lower part a channel for the passing of lubricant and being engaged in said notch to be held against endwise movement on the axle and against turning on the axle, substantially as described.

7. In a railway car, the combination with an axle and a wheel and an axle box surrounding the axle, of an angle member parallel to the length of the car body and having a pedestal flange extending between the wheel hub and the axle box and having a notch through which the axle extends, a collar surrounding the axle and having a neck in said notch and said collar making engagement with said flange, whereby said collar is held against endwise movement on the axle in either direction, substantially as described.

8. In a railway car, the combination with an axle and a wheel and an axle box surrounding the axle, of an angle member parallel to the length of the car body and having a pedestal flange extending between the wheel hub and the axle box and having a notch through which the axle extends, a collar surrounding the axle and having a neck in said notch and said collar making engagement with said flange, whereby said collar is held against turning on the axle and against endwise movement on the axle in either direction, substantially as described.

9. In a railway car, the combination with an axle and a wheel surrounding the axle, of an axle box, rollers surrounding the axle within the axle box, a flange seated on the end of the axle box which is adjacent said hub and directed toward the hub, said flange being large enough to leave space between said flange and the axle for the passing of lubricant from the axle box, and a collar formed for the passing of lubricant along the axle and having a flange overlapping said axle box flange, substantially as described.

10. In a railway car, the combination with an axle and a wheel surrounding the axle, of an axle box surrounding the axle, a collar surrounding the axle between the axle box and the wheel hub, a part of said collar being spaced from the axle to allow the passing of lubricant, substantially as described.

11. In a railway car, the combination with an axle and a wheel and an axle box surrounding the axle, of a pedestal flange seated on the car body, and a collar surrounding the axle between the axle box and the wheel hub and engaging the pedestal flange, a part of said collar being spaced from the axle to allow the passing of lubricant, substantially as described.

12. In a railway car, the combination with an axle and a wheel surrounding the axle and an axle box surrounding the axle adjacent the wheel, of a collar surrounding the axle between the wheel and the axle box and being annularly interiorly recessed, and a washer surrounding the axle within the recess of the collar, substantially as described.

13. In a railway car, the combination with an axle and a wheel surrounding the axle and an axle box surrounding the axle adjacent the wheel, of a collar surrounding the axle between the wheel and the axle box and being annularly interiorly recessed, and a washer surrounding the axle within the recess of the collar, said washer having a shorter radius than the radius of the recess and the washer having a marginal extension for moving lubricant in the recess, substantially as described.

14. In a railway car, the combination with an axle and a wheel surrounding the axle and an axle box surrounding the axle adjacent the wheel, of a collar surrounding the axle between the wheel and the axle box and being interiorly spaced for the passing of lubricant and being annularly interiorly recessed, and a washer surrounding the axle within the recess of the collar, substantially as described.

15. In a railway car, the combination with an axle and a wheel surrounding the axle and an axle box surrounding the axle adjacent the wheel and having an end flange surrounding the axle, of a collar surrounding and having a neck resting on the axle between the wheel and the axle box and the collar having its ends surrounding the axle box sleeve and the wheel hub and the collar being annularly interiorly recessed, and a washer surrounding the axle within the recess of the collar, substantially as described.

16 In a railway car, the combination with an axle and a wheel surrounding the axle and an axle box surrounding the axle adjacent the wheel and having an end flange surrounding the axle, of a collar surrounding and having a neck resting on the axle between the wheel and the axle box and the collar having its ends surrounding the axle box sleeve and the wheel hub and the collar being annularly interiorly recessed, and a washer surrounding the axle within the recess of the collar, the washer having a shorter radius than the radius of the recess and the washer having a marginal extension for moving lubricant in the recess, substantially as described.

17. In a railway car, the combination with an axle and a wheel surrounding the axle and an axle box surrounding the axle, of a collar surrounding the axle between the axle and the wheel and having a part spaced from the axle to permit the passing of lubricant, and means for holding said collar against endwise movement, substantially as described.

18. In a railway car, the combination with an axle and a wheel surrounding the axle and an axle box surrounding the axle, of a collar surrounding the axle between the axle and the wheel and having a part spaced from the axle to permit the passing of lubricant, and means for holding said collar against turning and endwise movement, substantially as described.

19. In a railway car, the combination with an axle and a wheel surrounding the axle, and an axle box surrounding the axle, of a collar surrounding the axle between the wheel hub and the axle box and being chambered to receive a washer, a washer located in said chamber and having a marginal extension for moving lubricant when said washer turns, and means for holding said collar against endwise movement, substantially as described.

20. In a railway car, the combination with an axle and a wheel surrounding the axle and an axle box surrounding the axle near the hub of the wheel and bearing an annular flange surrounding and free from the axle and directed toward the wheel hub, a collar supported by the axle and having one end surrounding said axle box flange and having its other end surrounding the wheel hub, and means for holding said collar against endwise movement, substantially as described.

21. In a railway car, the combination with an axle and a wheel surrounding the axle and an axle box surrounding the axle near the hub of the wheel and bearing an annular flange surrounding and free from the axle and directed toward the wheel hub, a collar supported by the axle and having one end surrounding said axle box flange and having its other end surrounding the wheel hub, and means for holding said collar against endwise movement and against turning, substantially as described.

22. In a railway car, the combination with an axle and a wheel surrounding the axle and an axle box surrounding the axle near the hub of the wheel and bearing an annular flange surrounding and free from the axle and directed toward the wheel hub, a collar supported by the axle and having one end surrounding said axle box flange and having its other end surrounding the wheel hub, packing between the collar and the axle box flange and between the collar and the wheel hub, and means for holding said collar against endwise movement, substantially as described.

In testimony whereof I have signed my name, this 4th day of September, in the year one thousand nine hundred and twenty-four.

HUGH W. SANFORD.